(12) United States Patent
Steinberger et al.

(10) Patent No.: US 10,752,103 B2
(45) Date of Patent: Aug. 25, 2020

(54) MOTOR ASSEMBLY FOR HYBRID VEHICLE

(71) Applicant: Schaeffler Technologies AG & Co. KG, Herzogenaurach (DE)

(72) Inventors: Markus Steinberger, Macedonia, OH (US); Patrick Lindemann, Wooster, OH (US); Matthew Payne, Glenmont, OH (US); Ayyalraju Satyaseelan, Wooster, OH (US); Gregory Heeke, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 24 days.

(21) Appl. No.: 16/150,317

(22) Filed: Oct. 3, 2018

(65) Prior Publication Data

US 2019/0105978 A1    Apr. 11, 2019

Related U.S. Application Data

(60) Provisional application No. 62/569,468, filed on Oct. 6, 2017.

(51) Int. Cl.
*B60K 6/387* (2007.10)
*B60K 6/26* (2007.10)
*B60K 6/405* (2007.10)

(52) U.S. Cl.
CPC ............... *B60K 6/387* (2013.01); *B60K 6/26* (2013.01); *B60K 6/405* (2013.01); *B60Y 2400/426* (2013.01)

(58) Field of Classification Search
CPC .......... B60K 6/26; B60K 6/387; B60K 6/405; B60Y 2400/426
See application file for complete search history.

(56) References Cited

U.S. PATENT DOCUMENTS

| 8,585,541 | B2 * | 11/2013 | Mueller | B60K 6/40 180/65.22 |
| 8,622,182 | B2 * | 1/2014 | Iwase | B60K 6/26 180/65.26 |
| 8,836,181 | B2 * | 9/2014 | Iwase | B60K 6/40 310/67 R |
| 8,836,187 | B2 * | 9/2014 | Iwase | B60K 6/26 310/78 |

(Continued)

*Primary Examiner* — Tinh Dang
(74) *Attorney, Agent, or Firm* — Kevin Parks

(57) ABSTRACT

A motor assembly for a hybrid vehicle includes an electric motor, a shaft, a multiplate clutch, and a housing. The electric motor has a rotatable rotor with a carrier. The shaft is arranged for drivingly engaging a combustion engine. The multiplate clutch is drivingly engaged with the carrier for releasably engaging the electric motor to the shaft. The housing includes a center support with a hydraulic channel extending from radially outside of the electric motor to radially inside of the electric motor. In an example embodiment, the motor assembly has a torque converter fixed to the carrier. In some example embodiments, the motor assembly has a concentric slave cylinder for engaging the clutch. The concentric slave cylinder is hydraulically connected to the center support hydraulic channel. In an example embodiment, the motor assembly has a pressing plate in contact with the slave cylinder and the multiplate clutch.

11 Claims, 1 Drawing Sheet

(56) References Cited

U.S. PATENT DOCUMENTS

| | | | | |
|---|---|---|---|---|
| 8,960,393 B2* | 2/2015 | Frait | ........................ | B60K 6/387 |
| | | | | 192/3.21 |
| 8,997,956 B2* | 4/2015 | Iwase | ........................ | B60K 6/26 |
| | | | | 192/3.26 |
| 9,140,311 B2* | 9/2015 | Iwase | ................... | F16D 25/0638 |
| 9,446,763 B2* | 9/2016 | Larkin | .................... | B60K 6/387 |
| 9,447,864 B2* | 9/2016 | Iwase | ..................... | B60K 6/405 |
| 9,579,965 B2* | 2/2017 | Frait | ........................ | B60K 6/405 |
| 9,581,210 B2* | 2/2017 | Frait | ......................... | B60K 6/48 |
| 2005/0072255 A1 | 4/2005 | McCrary | | |
| 2005/0155826 A1 | 7/2005 | Kohno | | |
| 2008/0121446 A1 | 5/2008 | Sanji | | |
| 2012/0103751 A1 | 5/2012 | Ikeda | | |
| 2012/0175212 A1* | 7/2012 | Hart | ........................ | B60K 6/387 |
| | | | | 192/48.601 |
| 2013/0111891 A1* | 5/2013 | Iwase | ...................... | F16D 33/02 |
| | | | | 60/347 |
| 2013/0193816 A1* | 8/2013 | Iwase | ..................... | H02K 7/003 |
| | | | | 310/75 R |
| 2017/0108054 A1 | 4/2017 | Baumann et al. | | |

* cited by examiner

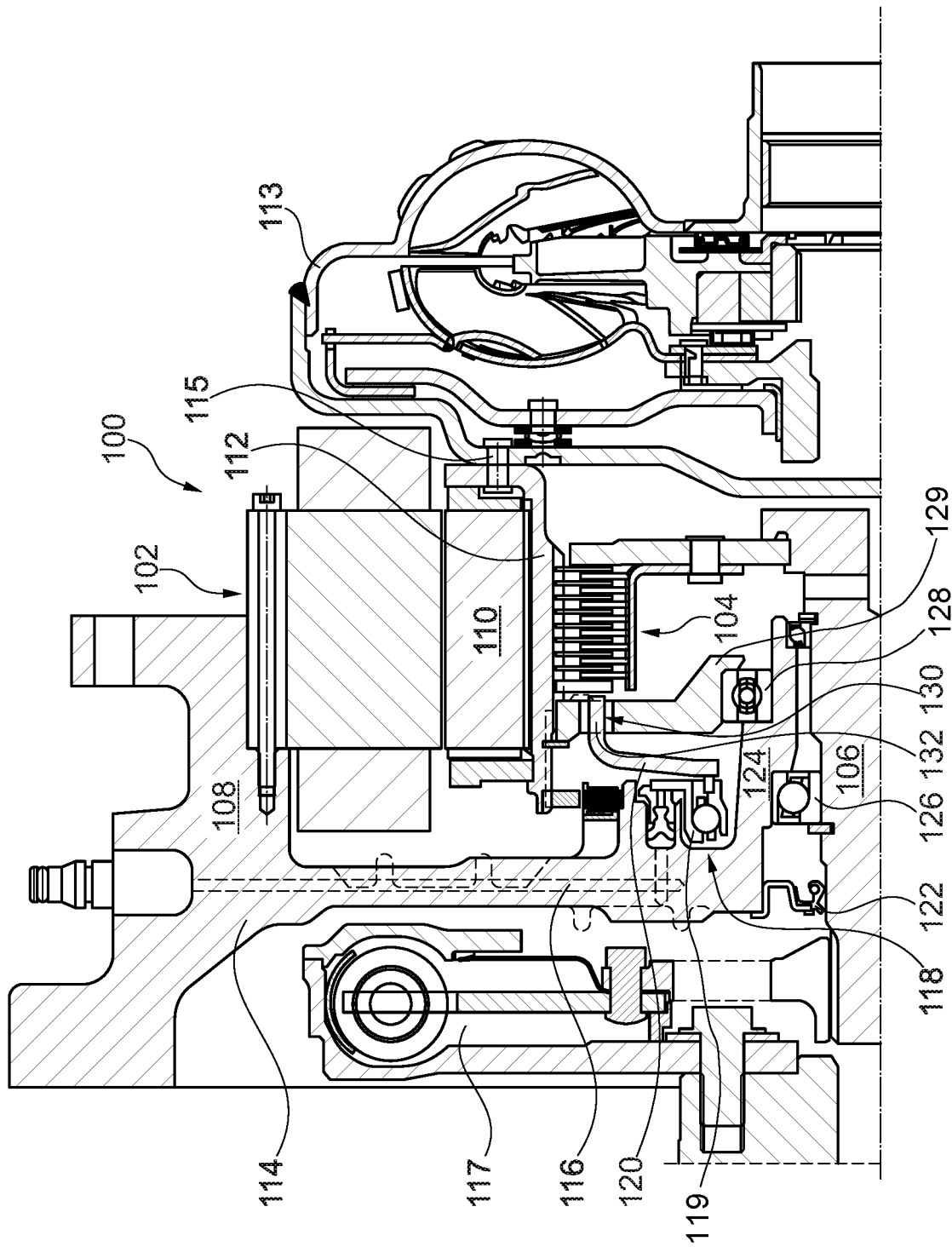

MOTOR ASSEMBLY FOR HYBRID VEHICLE

TECHNICAL FIELD

The present disclosure relates generally to a motor assembly, and more specifically to a motor assembly for a hybrid vehicle.

BACKGROUND

Hybrid modules are known. One example is shown in U.S. Pat. No. 8,960,393 titled MODULAR POWERTRAIN COMPONENT FOR HYBRID ELECTRIC VEHICLES to Frait et al.

SUMMARY

Example embodiments broadly comprise a motor assembly for a hybrid vehicle including an electric motor, a shaft, a multiplate clutch, and a housing. The electric motor has a rotatable rotor with a carrier. The shaft is arranged for drivingly engaging a combustion engine. The multiplate clutch is drivingly engaged with the carrier for releasably engaging the electric motor to the shaft. The housing includes a center support with a hydraulic channel extending from radially outside of the electric motor to radially inside of the electric motor. In an example embodiment, the motor assembly has a torque converter fixed to the carrier. In some example embodiments, the motor assembly has a concentric slave cylinder for engaging the clutch. The concentric slave cylinder is hydraulically connected to the center support hydraulic channel. In an example embodiment, the motor assembly has a pressing plate in contact with the slave cylinder and the multiplate clutch.

In some example embodiments, the motor assembly has a seal installed on the center support and extending to the shaft. The center support includes an axially extending protrusion at least partially radially aligned with the electric motor. In an example embodiment, the motor assembly has a bearing installed in the axially extending protrusion for radially supporting the shaft. In some example embodiments, the motor assembly has a concentric slave cylinder and a support plate. The concentric slave cylinder is hydraulically connected to the center support hydraulic channel. The support plate extends radially from the carrier towards the axially extending protrusion. In an example embodiment, the motor assembly has a bearing installed between the support plate and the axially extending protrusion. In some example embodiments, the motor assembly has a pressing plate in contact with the slave cylinder and the multiplate clutch. In an example embodiment, the support plate includes an orifice and the pressing plate includes an axial tab extending through the orifice to contact the multiplate clutch.

BRIEF DESCRIPTION OF THE DRAWINGS

The single FIGURE illustrates a top half cross-sectional view of a motor assembly for a hybrid vehicle according to an example aspect of the present disclosure.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The FIGURES are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Motor assembly 100 for a hybrid vehicle includes electric motor 102, multiplate clutch 104, shaft 106, and housing 108. The motor includes rotatable rotor 110 with carrier 112. The carrier is connected to torque converter 113 at rivet 115. The multiplate clutch is drivingly engaged with the carrier for releasably engaging the electric motor to a combustion engine via damper 117, for example. The shaft is drivingly engaged with the multiplate clutch and arranged for engaging to the combustion engine. The housing includes center support 114 with hydraulic channel 116 extending from radially outside of the electric motor to radially inside of the electric motor.

Motor assembly 100 includes concentric slave cylinder 118 for engaging the clutch and connected to the center support hydraulic channel. Slave cylinder 118 includes bearing 119. The motor assembly includes pressing plate 120 in contact with the slave cylinder and the multiplate clutch. The motor assembly includes seal 122 installed on the center support and extending to the shaft. The center support includes axially extending protrusion 124 at least partially radially aligned with the electric motor. The motor assembly includes bearing 126 installed in the axially extending protrusion for radially supporting the shaft. The motor assembly includes bearing 128 installed between support plate 129 and the axially extending protrusion. The support plate includes orifice 130 and the pressing plate includes axial tab 132 extending through the orifice.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMERALS

100 Motor assembly
102 Electric motor
104 Multiplate clutch
106 Shaft
108 Housing
110 Rotatable rotor
112 Carrier
113 Torque converter
114 Center support
115 Rivet
116 Hydraulic channel
117 Damper
118 Concentric slave cylinder
120 Pressing plate
122 Seal
124 Axially extending protrusion
126 Bearing
128 Bearing
130 Orifice
132 Axial tab

What is claimed is:

1. A motor assembly for a hybrid vehicle, comprising:
an electric motor including a rotatable rotor with a carrier;
a shaft arranged for drivingly engaging a combustion engine;
a multiplate clutch drivingly engaged with the carrier for releaseably engaging the electric motor to the shaft;
a housing including a center support with a hydraulic channel extending from radially outside of the electric motor to radially inside of the electric motor; and
a concentric slave cylinder for engaging the multiplate clutch, wherein the concentric slave cylinder is installed in the housing, sealed directly to the housing, and hydraulically connected to the hydraulic channel.

2. The motor assembly of claim 1 further comprising a torque converter fixed to the carrier.

3. The motor assembly of claim 1 wherein the concentric slave cylinder comprises a bearing.

4. The motor assembly of claim 3 further comprising a pressing plate in contact with the bearing and the multiplate clutch.

5. The motor assembly of claim 1 further comprising a seal installed on the center support and extending to the shaft, wherein the center support includes an axially extending protrusion at least partially radially aligned with the electric motor.

6. The motor assembly of claim 5 further comprising a first bearing installed in the axially extending protrusion for radially supporting the shaft.

7. The motor assembly of claim 5 further comprising a support plate extending radially from the carrier towards the axially extending protrusion.

8. The motor assembly of claim 7 further comprising a second bearing installed between the support plate and the axially extending protrusion.

9. The motor assembly of claim 7 further comprising a pressing plate in contact with the concentric slave cylinder and the multiplate clutch.

10. The motor assembly of claim 9 wherein the support plate includes an orifice and the pressing plate includes an axial tab extending through the orifice to contact the multiplate clutch.

11. A motor assembly for a hybrid vehicle, comprising:
an electric motor including a rotatable rotor with a carrier;
a shaft arranged for drivingly engaging a combustion engine;
a multiplate clutch drivingly engaged with the carrier for releaseably engaging the electric motor to the shaft;
a housing including a center support comprising:
a hydraulic channel extending from radially outside of the electric motor to radially inside of the electric motor; and
an axially extending protrusion at least partially radially aligned with the electric motor;
a concentric slave cylinder hydraulically connected to the hydraulic channel;
a support plate extending radially from the carrier towards the axially extending protrusion, and comprising an orifice; and
a pressing plate in contact with the concentric slave cylinder and the multiplate clutch, and comprising an axial tab extending through the orifice to contact the multiplate clutch.

* * * * *